United States Patent Office 3,460,924
Patented Aug. 12, 1969

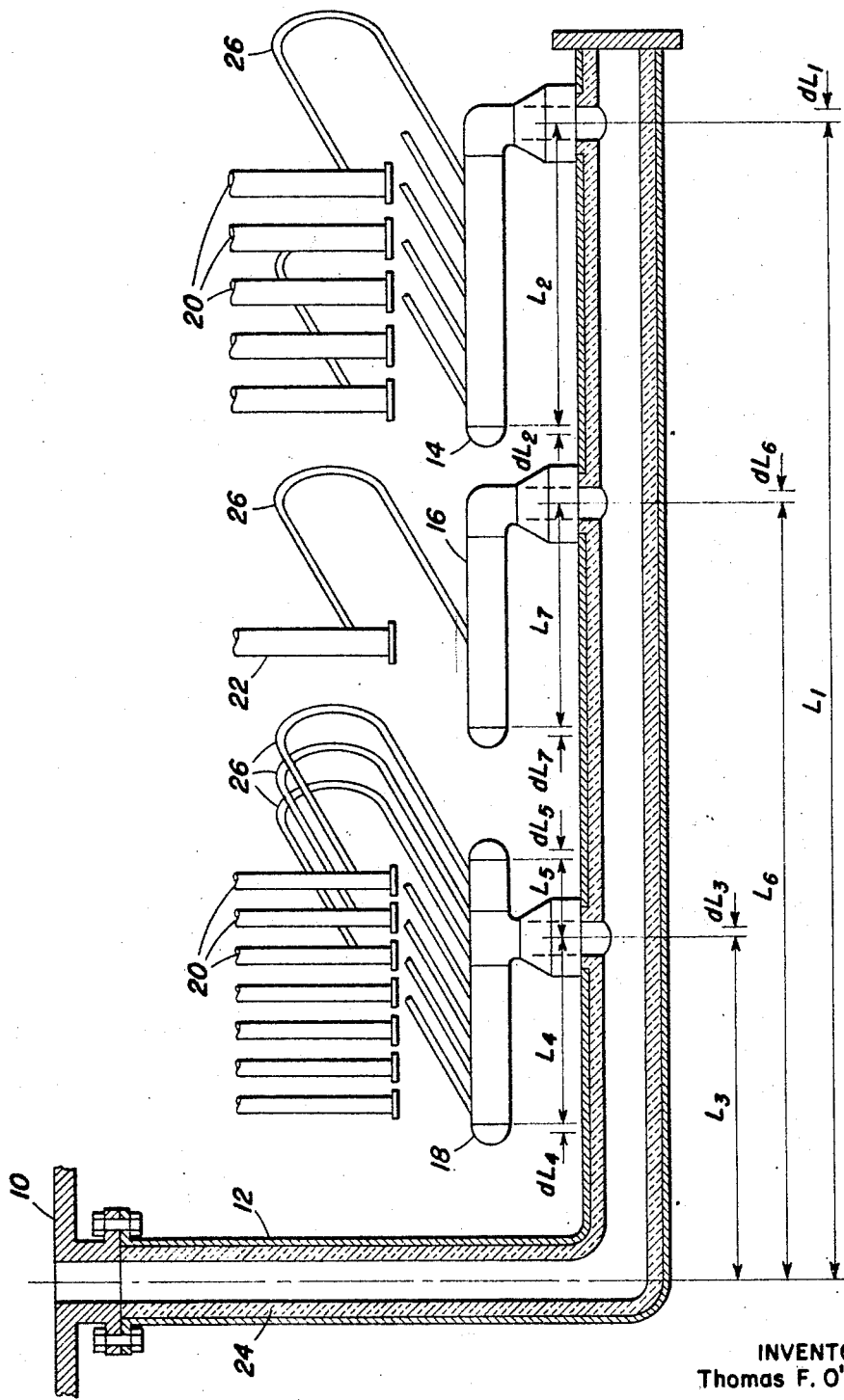

3,460,924
MANIFOLD SYSTEM FOR HEATERS
Thomas F. O'Sullivan, Wilton, Conn., assignor to The Lummus Company, New York, N.Y., a corporation of Delaware
Filed Mar. 14, 1966, Ser. No. 533,970
Int. Cl. C01j 3/82
U.S. Cl. 48—126    14 Claims

ABSTRACT OF THE DISCLOSURE

Manifold arrangement for collection of high temperature fluids from processing tubes comprised of a plurality of sub-manifolds anchored at one end to a collector manifold, the free ends of the sub-manifolds extending toward the anchored end of the collector manifold, the sub-manifolds being connected to the processing tubes through small expansion loops. The manifold assembly is capable of accommodating thermal expansion without expansion joints.

---

This invention relates generally to a manifold system for hot fluids and, more particularly, the invention relates to an improved outlet manifold for process heaters and the like which inherently compensates for thermal expansion of the manifold itself, even at very high operating temperatures. While not limited thereto, the manifolds of the invention are particularly adapted for use as outlet manifolds on steam reformers used for production of hydrogen, methanol synthesis gas, ammonia synthesis gas, and the like.

In pipelines where thermal expansion is greater than can be accommodated by the natural flexibility of the line itself, it is essential to use some sort of expansion joint, i.e., some sort of flexible device which will have enough flexibility to absorb the expansion. Perhaps the simplest such device is a simple, U-shaped bent on a loop of pipe, which allows the straight lengths of pipe in either side to expand inwardly into the open end of the U. Where such a simple device is inadequate, either a packed slip expansion joint or a bellows expansion joint is generally employed. In the slip type of joint, one pipe end slides within another, larger pipe, being sealed to it by a stuffing box containing packing. Bellows type expansion joints are designed for particular temperatures and pressures, and may be a simple corrugated copper or rubber sleeve held to the pipe ends with rings, or bellows may be formed of metal rings welded together at their outer and inner periphery.

In the construction of process heaters as commonly used in the chemical process industries, the severest thermal expansion problems are of course those associated with the process tubes themselves, since these tubes are subjected to direct heat of the flame or other heat source within the furnace. Because of this expansion of the tubes themselves, suitable arrangements must be made to allow for it. Since the tubes cannot ordinarily accommodate manifold expansion too it is the manifold or other connection which must absorb the tube expansion.

The manifold itself is of course subject to expansion due to the absorption of sensible heat from the process fluid passing therethrough. Heretofore, one of the aforementioned types of expansion joints placed at a suitable point on the manifold was generally satisfactory. The recent advances in the technology of steam reforming and other process heaters, however, has resulted in such higher effluent temperatures and pressures that conventional expansion joints no longer offer a practical solution. Further, the increased size of commercial process heaters makes the use of conventional expansion loops costly and, more important, very cumbersome.

It is thus a general object of the present invention to provide an improved manifold arrangement for process heaters.

Another object of the invention is to provide an outlet manifold arrangement for high temperature heaters and other process equipment which is simple, compact and economical.

Still another object of the present invention is to provide an outlet manifold arrangement for process heaters which accommodates thermal expansion at very high temperatures without the need for expansion joints.

Various other objects and advantages of the invention will become clear from the following detailed description of several embodiments of the invention, and the novel features will be particularly pointed out in connection with the appended claims.

In essence the present invention comprises a combination of small expansion loops which connect the individual process tube with a plurality of sub-manifolds together with a novel arrangement of sub- and collector manifolds. The sub-manifolds and main manifold are arranged and sized so that expansion of the sub- and collector manifolds are nearly equal and in opposite directions. Any remaining unbalanced expansion is thus very small and can be accommodated by the small expansion loops without undue strain. These expansion loops also accommodate tube expansion between the nearest point of tube support and the point of connection. The collector manifold is anchored at one end, from which expansion proceeds, and the sub-manifolds are arranged so that their expansion is in the direction opposite, In a preferred embodiment of the invention expansion difference in the sub- and collector manifolds (which can be large due to size differences) are minimized by employing an internally insulated collector manifold and externally insulated sub-manifolds.

Pipes, as all solids, expand linearly with temperature. While rate of expansion is not constant at all temperatures, there are materials for which this is nearly so. Thus, with a known material, its thermal expansion within a given temperature range can be calculated with accuracy.

It is the purpose of outlet manifolds to collect process fluid passing through one or more process tubes in a heater and, generally, pass it directly to another piece of equipment such as a waste heater boiler, a secondary reformer or the like. As this piece of equipment is usually massive, the manifold is anchored to it, and thermal expansion proceeds from this anchoring point. This means that expansion is in essentially one direction, for which the equation is as follows, $$L_t = L_0(1 + \alpha T) \tag{I}$$

where $L_t$ is length at operating temperature, $L_0$ is length at 0° F., $\alpha$ is the temperature coefficient of thermal expansion (generally expressed in inches per inch per degree Fahrenheit) and T is the operating temperature. While some steels have an $\alpha$ which varies from 6 to 12 ($\times 10^{-6}$) over a temperature range of 68° to 2,000° F., there are, for example, martensitic stainless steel alloys where $\alpha$ varies only from about 5.9 to 6.7 ($\times 10^{-6}$) within this range, and their use is preferred.

In one aspect, the invention comprises mounting a plurality of sub-manifolds on the collector manifold, each sub-manifold pointing in a direction opposite to the direction of expansion of the collector manifold so that expansion of one counteracts expansion of the other, thus minimizing transverse strains on the expansion loops connecting the sub-manifolds with the process tubes. Another aspect of the invention comprises proportioning the length of each individual sub-manifold in accordance with its position on the collector manifold so that the total expansion of the collector manifold at that point will be approximately counterbalanced by expansion of the sub-manifold. Still another aspect of the invention relates to using an internally-insulated collector manifold (minimizing expansion) and externally insulated sub-manifolds (maximizing expansion) whereby the matching of expansions is rendered easier.

Understanding of the invention will be facilitated by referring to the accompanying drawing, which is a schematic illustration partially in section, showing three embodiments of the invention, and the following discussion of same.

In the drawing, the anchoring point of the manifold system, for example a waste heat boiler or secondary reformer, is designated by the numeral 10. The main or collector manifold 12 is attached to the anchoring point by a suitable flange and is shown as having three sub-manifolds 14, 16, 18. In the drawing, each of these sub-manifolds is illustrated as a different embodiment of the invention, it being understood that in a commercial installation particular embodiments would be employed. Sub-manifolds 14 and 18 are of the type which may be employed on a steam reformer where a plurality of one-pass process tubes 20 must be connected to the manifold. As explained more fully hereinbelow, sub-manifold 18 is particularly adapted for use relatively near the collector manifold anchoring point. Manifold 16 is of the type having only a single connection to a process tube 22, as is used in multiple-pass furnaces such as naphtha cracking furnaces. As illustrated, collector manifold 12 is shown (in section) having internal insulation 24, so that metal temperature is as low as possible, while sub-manifolds 14, 16 and 18 are all externally insulated. In all embodiments of the invention, connection of the process tubes 20, 22 to the sub-manifolds 14, 16, 18 is by means of small expansion loops 26, which readily accommodate the vertical expansion of process tubes 20, 22, between their point of support and the point of connection.

Cooperation of collector manifold 12 and sub-manifold 14 will be described first. The horizontal distance of manifold 12 to the point of connection of sub-manifold 14 is $L_1$, and at a temperature T it expands a distance $dL_1$, which is equal to $L_t - L_0$ in the terms of Equation I. Similarly, sub-manifold 14 has a length $L_2$ and expands a distance of $dL_2$ at the operating temperature (which can safely be assumed to be constant throughout the length of the manifold system). The length of sub-manifold 14 is chosen so that at the operating temperature, $dL_2$ is approximately equal to $2dL_1$. Thus the loop 26 farthest to the left will be moved slightly to the left and the loop at the right end will be moved an equal amount to the right. A loop in the middle of sub-manifold 14 will not move at all, inasmuch as at the point $dL_1$ will equal $dL_2$. Even when it is not possible to proportion the sub-manifold as indicated above, the maximum movement imposed by expansion at any point $L_n$ along its length will be the difference between $dL_n$ and $dL_1$.

The foregoing principles are more difficult to apply to sub-manifolds quite near the anchor point, i.e., where $dL$ is quite small. A preferred arrangement for this situation is illustrated by sub-manifold 18, located a distance $L_3$ from the anchor point, and where expansion is $dL_3$. Sub-manifold 18 has a left-ward expanding arm of length $L_4$ and a shorter, right-expanding arm of length $L_5$. To achieve an overall balanced expansion in this instance $L_4$ is chosen so that $dL_4$ is approximately equal to $2dL_3 + dL_5$. Again, the movement imposed by expansion will be equal and opposite at the respective ends of the sub-manifold, and will be zero at an intermediate point.

It is to be noted that while sub-manifold 18 is a preferred design for the situation described, it is somewhat more expensive to fabricate and should not be used unless the lateral movement of the expansion loops would be too great on the ordinary type of sub-manifold (i.e. 14).

Sub-manifolds 14 and 18 are peculiar to steam reformers and other equipment where a large number of outlet connections must be made. The principle of the invention is also applicable to single connections, and such an arrangement is illustrated by sub-manifold 16. This is located a distance $L_6$ from the anchor point, and the sub-manifold has a length $L_7$. In this instance $L_7$ is selected so that $dL_7$ is equal to $dL_6$, so that there is essentially no lateral movement imposed by expansion.

It will be clear to those skilled in the art that for $dL_2$ to be equal to $2dL_1$, either $L_2$ would have to be quite long, or a material having a much higher coefficient of expansion ($\alpha$) would have to be used. To obviate these difficulties, the collector manifold is preferably internally lined with insulation, thus keeping the wall temperature as low as possible and minimizing $dL_1$, and the sub-manifolds are externally insulated, so that their wall temperatures approach that of the process fluid and $dL_2$ is a relatively large value. Of course, this complicates the calculation of expansion in that the actual wall temperature of the collector manifold must be known, but this is readily determinable by reference to the thermal properties of whatever insulation 24 is used.

Various changes in the details, steps, materials and arrangements of parts, which have been herein described and illustrated in order to explain the nature of the invention, may be made by those skilled in the art within the principle and scope of the invention as defined in the appended claims.

What is claimed is:

1. A manifold system for use in collection of fluids at elevated temperatures from a plurality of sources that comprises:

a collector manifold anchored at one end;

a plurality of sub-manifolds each in fluid communication with said collector manifold along the length thereof, each said sub-manifold being parallel to and spaced from said collector manifold and being attached to said collector manifold at one end thereof only, the other end being free, the free end of said sub-manifolds extending toward the anchored end of said collector manifold, whereby thermal expansion of said sub-manifolds is in a direction opposite to thermal expansion of said collector manifold; and means for connecting said sub-manifolds to said plural sources of fluid.

2. The manifold system as claimed in claim 1, and additionally comprising internal insulation within said collector manifold, whereby thermal expansion thereof is reduced.

3. The manifold system as claimed in claim 2, and additionally comprising external insulation on each of said sub-manifolds.

4. The manifold system as claimed in claim 1, wherein said fluid sources are process tubes, and said means connecting said sub-manifolds to said process tubes includes generally U-shaped tubes capable of accommodating thermal expansion of said process tubes.

5. The manifold system as claimed in claim 3, wherein the length of each sub-manifold is such that its thermal expansion at a given elevated temperature is approximately twice the thermal expansion of the collector manifold at the point of attachment.

6. The manifold system as claimed in claim 3, wherein the sub-manifold closest to the anchored end of said collector manifold has one arm extending toward said anchored end and a second arm extending away from said anchored end, and the length of said one arm is such that its thermal expansion at a given elevated temperature is approximately twice the thermal expansion of the collector manifold at the point of attachment plus the thermal expansion of said second arm.

7. The manifold system as claimed in claim 3, wherein each sub-manifold is in fluid communication with a source of fluid only near the free end thereof, and the length of each sub-manifold is such that its thermal expansion at a given elevated temperature is approximately equal to the thermal expansion of the collector manifold at the point of attachment.

8. An outlet manifold system for use with a process heater having a plurality of freely-expanding process tubes comprising:
   a collector manifold anchored at one end;
   a plurality of sub-manifolds each in fluid communication with said collector manifold along the length thereof; each said sub-manifold being parallel to and spaced from said collector manifold and being attached to said collector manifold at one end thereof only the other end being free, the free end of said sub-manifolds extending toward the anchored end of said collector manifold, whereby thermal expansion of said sub-manifolds is in a direction opposite to thermal expansion of said collector manifold; and
   a plurality of generally U-shaped tubes capable of accommodating the thermal expansion of said process tubes in fluid communication with said process tubes and said sub-manifolds.

9. The manifold system as claimed in claim 8, and additionally comprising internal insulation within said collector manifold, whereby thermal expansion thereof is reduced.

10. The manifold system as claimed in claim 9, and additionally comprising external insulation on each of said sub-manifolds.

11. The outlet manifold system as claimed in claim 9, wherein each said sub-manifold is in fluid communication with a plurality of process tubes by said U-shaped tubes attached along its length.

12. The manifold system as claimed in claim 11, wherein the length of each sub-manifold is such that its thermal expansion at a given elevated temperature is approximately twice the thermal expansion of the collector manifold at the point of attachment.

13. The outlet manifold system as claimed in claim 9, wherein each said sub-manifold is in fluid communication with a single process tube by a U-shaped tube attached near said free end.

14. The outlet manifold system as claimed in claim 13, wherein the length of each sub-manifold is such that its thermal expansion at a given elevated temperature is approximately equal to the thermal expansion of the collector manifold at the point of attachment.

References Cited

UNITED STATES PATENTS

| | | | |
|---|---|---|---|
| 2,781,251 | 2/1957 | Howell | 23—277 |
| 2,956,864 | 10/1960 | Coberly | 23—277 |
| 3,053,512 | 9/1962 | Soudan et al. | 165—82 |
| 3,257,172 | 6/1966 | Kao et al. | 23—277 |

FOREIGN PATENTS

| | | |
|---|---|---|
| 589,592 | 3/1959 | Italy. |
| 603,577 | 4/1960 | Italy. |

MORRIS O. WOLK, Primary Examiner

R. E. SERWIN, Assistant Examiner

U.S. Cl. X.R.

23—277; 165—144